W. C. HICKS.
Sewing Machine.
No. 31,805.
2 Sheets—Sheet 1.
Patented March 26, 1861.
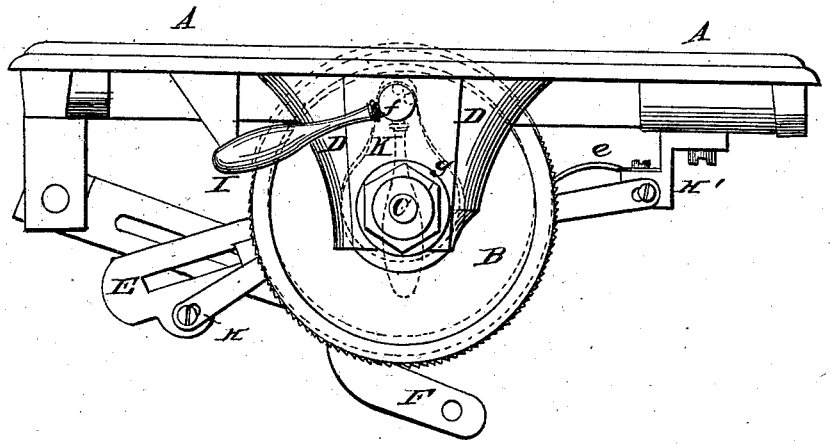
Fig. 1.
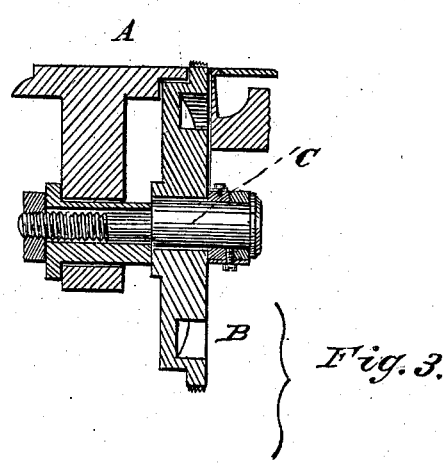
Fig. 3.
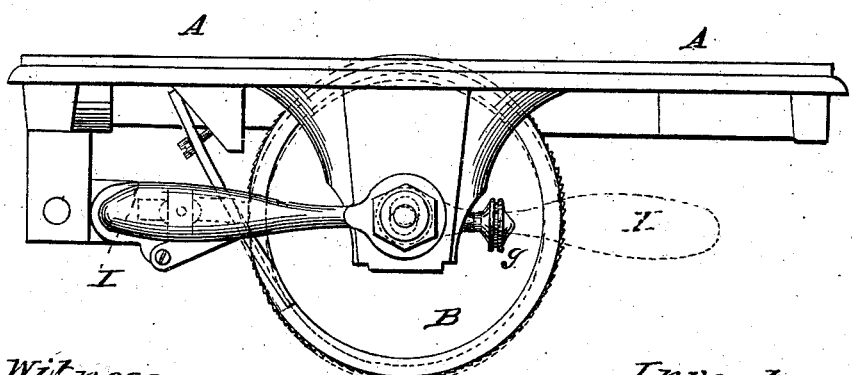
Witnesses:
Inventor:
William Cleveland Hicks by
A Pollok W. C. HICKS.
Sewing Machine.
No. 31,805.
2 Sheets—Sheet 2.
Patented March 26, 1861.
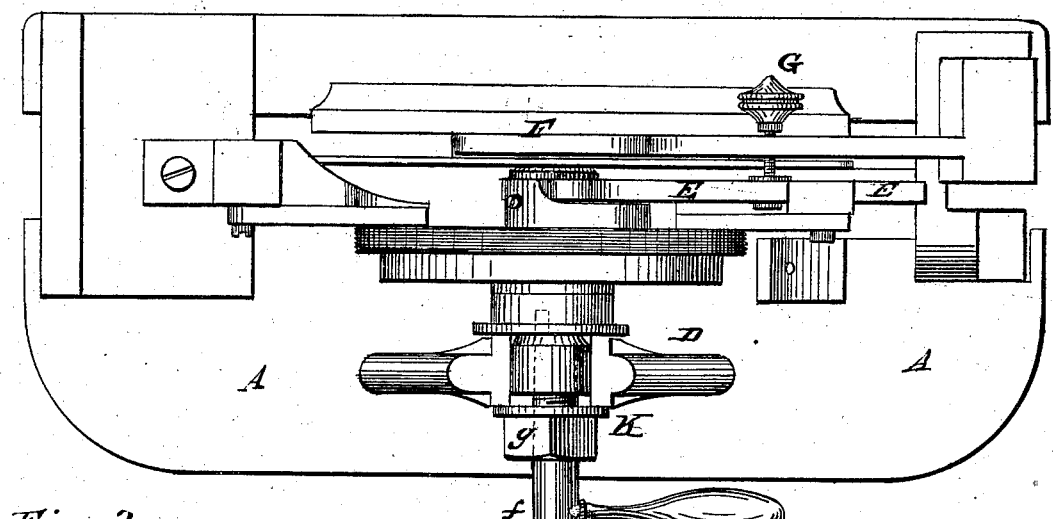
Fig. 2.
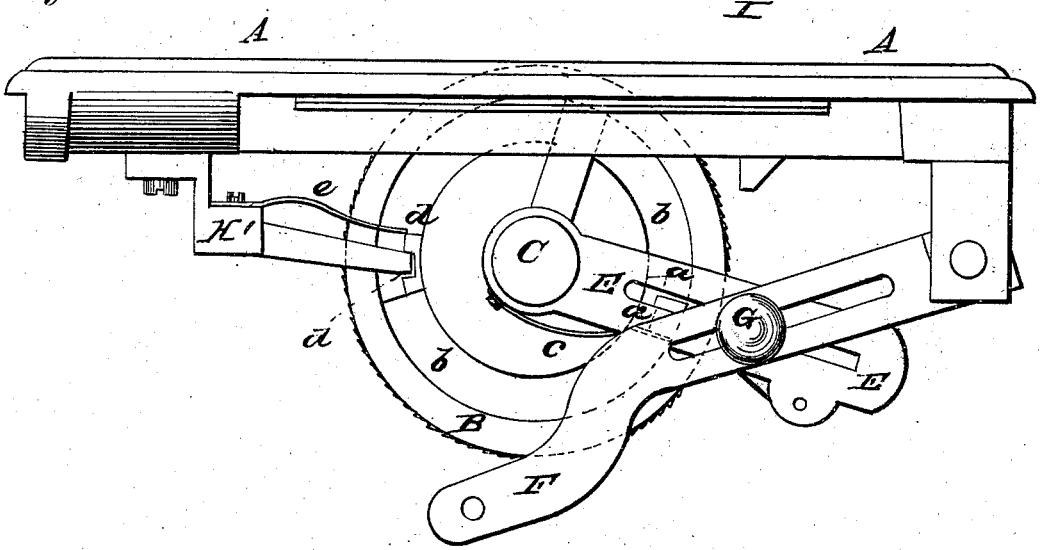
Witnesses:
Inventor:
William Cleveland Hicks

UNITED STATES PATENT OFFICE.

WILLIAM CLEVELAND HICKS, OF BOSTON, MASSACHUSETTS.

IMPROVEMENT IN SEWING-MACHINES.

Specification forming part of Letters Patent No. 31,805, dated March 26, 1861.

*To all whom it may concern:*

Be it known that I, WILLIAM CLEVELAND HICKS, of Boston, in the county of Suffolk and State of Massachusetts, have invented certain new and useful Improvements in the Feed Mechanism of Sewing-Machines; and I do hereby declare that the following, taken in connection with the accompanying drawings, which form part of this specification, is such a full and clear description of the same as to enable others skilled in constructing and operating sewing-machines to make and use it.

My improvement is in no way restricted to any particular class of sewing-machines, but is applicable to all in which a serrated wheel or its equivalent is used to effect the feed of the material being sewed.

In the accompanying drawings, Figure 1 represents a front view of a sewing-machine table with my improvement in one form applied to the feeding mechanism; and Fig. 2 shows a back elevation and inverted plan of the same, delineating the table or bed-plate in part only. Fig. 3 shows a front and sectional elevation of a modification for effecting the adjustment of the feed-wheel, in like manner as in Figs. 1 and 2.

The nature of my invention consists in the employment of a mechanical device or means in connection with the feed-wheel or its shaft, and operating to raise or lower the latter by direct action on it, or independently of unfastening and adjusting the usual or any other equivalent fixed-bracket arrangement for the support or guidance of the shaft. Heretofore the feed-wheel has only been capable of being raised and lowered to vary its depth of projection or dip into or against the surface of the material passing over it by slackening or removing the screws or their equivalents which secure the fixed bracket that carries the wheel, and then adjusting the bracket and fastening it again. Such adjustment takes time, and can only be done when the machine is at rest. By my invention, however, the feed-wheel may be raised or lowered by simply moving a lever or screw, so as to adjust the wheel direct in the manner described, and which may be done while the machine is in motion or when at rest, and the smallest and greatest nicety of adjustment be effected to suit different materials being fed. By it, also, the feed-wheel may be lowered sufficiently to free it from feeding contact with the material while the machine is working, so as to cause two or more stitches to be taken in one place, and thereby fastening the seam or tying it; or, on the other hand, the feed-wheel can be raised while the machine is moving to go over a thick place in the work, such as a heavy seam.

In Figs. 1 and 2 of the accompanying drawings, which show my improvements applied to a serrated intermittently-revolving feed-wheel arranged below the bed or table and projecting through the same, but which are applicable to other dispositions of feed-wheel and to wheels either rotating on the stud or shaft which carries it or turning with the shaft, the portion marked A denotes the bed or table of a sewing-machine, and B the feed-wheel.

C is the shaft or stud of the wheel, passing through a vertically-slotted bracket, D, and carrying at its back end a slotted lever, E, which has an intermittent reciprocating motion communicated to it by a slotted arm or lever, F, driven by any suitable means, and connected with the first-named lever, E, through the slots of the two levers by a regulating screw or clamp, G, which, accordingly as it is set along the slots, serves to regulate the length of feed.

The lever E has loosely pivoted to it an arm, H, provided or gearing at its front end with wedges or friction-blocks $a$ $a$, that fit in a a groove, $b$, made in the feed-wheel, and that, in connection with a spring, $c$, serve, as the arm is reciprocated, to drive the feed-wheel forward or in one direction, but not in the other or back course, as well understood. As, however, there is more or less risk of the wheel being worked backward, means to prevent such action are usually necessary, and not only have brakes been used, but also pawls and ratchets and a friction-dog, arranged to work in the groove of the wheel on the opposite side to that of the driving-dog, and reversely as regards its bite to that of the latter, but hung by an arm to the feed-wheel shaft, which is in many respects objectionable. I therefore arrange wedges or friction-blocks D D, similar to those employed for driving the wheel forward, in the groove $b$ of the wheel on the opposite side of its axis to that occupied by the driving-blocks, and set to bite upon the wheel reversely to the latter, so that the one set of blocks serve to move the wheel forward and the other to retain it from moving back, as readily seen and understood by reference to previous arrangements for effecting the like object. This last-described set of retaining-blocks, d d, however, which are constructed not to impede the forward movement of the wheel in like manner as the driving-blocks work free in their back motion, are, together with their spring e, connected by their loosely-pivoted arm or lever which carries them, not with the shaft of the feed-wheel, but altogether independent thereof, and to a bracket, H, or its equivalent, firmly secured to the table of the machine.

The means for raising or lowering the feed-wheel, as previously alluded to, are or may be substantially as follows: I is a small handle or lever fitted onto a shaft, f, arranged above the feed-wheel shaft c and passing through the bracket D. This handle I is preferably situated in front, to facilitate the handling of it, and accordingly as it is turned to the right or to left, as indicated by black and red lines in Fig. 1, the feed-wheel is raised or lowered more or less, according to the position to which the handle is adjusted. This is or may be done by means of a rod, K, arranged to fit loosely the feed-wheel shaft c, and coupling the latter with the small shaft f, the inner end of which is eccentric, and to which the handle I is secured. As the pitch of the eccentric need be but small in relation to the throw of the lever or handle I, screwing tight the nut g, which secures the feed-wheel stud, will not prevent the adjustment of the feed-wheel by the lever I, as described. In this way may the feed-wheel be rapidly and easily raised and lowered with the greatest nicety, even, if desired, when the machine is running, and all that has before been claimed for my invention be readily attained.

It will be obvious that as a mechanical equivalent a regulating-screw may take the place of the eccentric to raise and lower the feed-wheel shaft; or the shaft or stud of the feed-wheel may be fitted to act as an eccentric to raise or lower the feed-wheel by simply turning it through a handle provided to said shaft, as illustrated in Fig. 3 of the drawings. In such case the tightening or locking screw g may be arranged to pass through the side of the bracket.

Having thus fully described my improvements and the manner in which the same are or may be carried into effect, I shall state my claim as follows:

I claim—

The method, substantially as herein described, of raising or lowering and adjusting the feed-wheel in relation to the sewing-table by combining with it, or the shaft or stud which carries it, an eccentric or screw under operation by a hand-lever or its equivalent, essentially as shown and described, whereby the adjustment may be effected, whether while the machine is operating or at rest, for the purposes set forth.

In testimony whereof I have signed my name to this specification before two subscribing witnesses.

WM. CLEVELAND HICKS.

Witnesses:
JAMES M. HICKS,
IVORY A. HURD.